(12) United States Patent
Imani

(10) Patent No.: US 6,464,028 B1
(45) Date of Patent: Oct. 15, 2002

(54) VEHICLE-DRIVE SYSTEM

(75) Inventor: Yuichi Imani, Hamamatsu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/617,776

(22) Filed: Jul. 17, 2000

(30) Foreign Application Priority Data

Jul. 22, 1999 (JP) .......................................... 11-208266

(51) Int. Cl.[7] .............................................. B60K 6/02
(52) U.S. Cl. ..................... 180/65.2; 180/65.4; 318/376; 701/22
(58) Field of Search ............................... 180/65.1, 65.2, 180/65.3, 65.8, 65.4, 65.6; 477/5; 318/587, 375, 376; 701/2

(56) References Cited

U.S. PATENT DOCUMENTS

| | | | | |
|---|---|---|---|---|
| 4,531,605 A | * | 7/1985 | Scholz et al. | 180/65.2 |
| 5,489,001 A | * | 2/1996 | Yang | 180/65.2 |
| 5,492,189 A | * | 2/1996 | Kriegler et al. | 180/65.2 |
| 5,667,029 A | | 9/1997 | Urban et al. | |
| 5,697,466 A | * | 12/1997 | Moroto et al. | 180/65.2 |
| 5,755,303 A | * | 5/1998 | Yamamoto et al. | 180/65.2 |
| 5,773,904 A | * | 6/1998 | Schiebold et al. | 180/65.2 |
| 5,839,533 A | * | 11/1998 | Mikami et al. | 180/65.2 |
| 6,098,733 A | * | 8/2000 | Ibaraki et al. | 180/65.2 |
| 6,251,037 B1 | * | 6/2001 | Baumgaertner et al. | 180/65.2 |
| 6,269,895 B1 | * | 8/2001 | Tanuguchi et al. | 180/65.2 |

FOREIGN PATENT DOCUMENTS

| | | |
|---|---|---|
| JP | 0-095944 | 4/1989 |
| JP | 8-251710 | 9/1996 |
| JP | 11-198671 | 7/1999 |

* cited by examiner

Primary Examiner—Michael Mar
(74) Attorney, Agent, or Firm—Oliff & Berridge, PLC

(57) ABSTRACT

The present invention provides a vehicle-drive system which can recovers inertial power from a vehicle. Torque of an internal-combustion engine is transferred to input shaft of transmission through main clutch. Dynamo-electric-machine mechanism is connected to input shaft of transmission through assistant clutch, and further, accessories are connected to dynamo-electric-machine mechanism. Therefore, in simple structure, substantially added by only assistant clutch relative to conventional structure, plural manners of operation can be realized by connecting or disconnecting two clutches thereby attaining other superior effects such as fuel-cost savings.

14 Claims, 6 Drawing Sheets

VEHICLE-DRIVE SYSTEM

CROSS-REFERENCE TO RELATED APPLICATION

The present invention is related to Japanese patent application No. Hei. 11-208266, filed Jul. 22, 1999; the contents of which are incorporated herein by reference.

FIELD OF THE INVENTION

The present invention relates to a vehicle-drive system, and more particularly, to a vehicle-drive system, which recovers inertial energy from a vehicle.

BACKGROUND OF THE INVENTION

In conventional vehicle-drive systems, torque from an internal-combustion engine is transferred to a vehicle drive shaft through a main clutch, an input shaft and a transmission. A starter, a generator motor and accessories for the vehicle-operating system are connected to a crank shaft through a belt drive system. However, when the vehicle is no longer accelerating, the inertial energy of the vehicle supplies energy from the wheels to the engine, and then to the vehicle accessories. However, in this system, when the generator and accessories are driven by inertial power of the vehicle, the inertial power of the vehicle cannot effectively be recovered due to friction loss from the internal-combustion engine, resulting in little fuel-cost savings. Moreover, when the vehicle is braked, the vehicle looses even more inertial energy due to the braking operation. The present invention was developed in light of these drawbacks.

SUMMARY OF THE INVENTION

It is therefore an object of the present invention to provide a vehicle-drive system, which drastically improves recovery of inertial power of a vehicle lost due to braking.

It is a further object of the present invention to provide the above described system while avoiding structural complication thereof.

It is yet another object of the present invention to aid the internal combustion engine when the engine is being started or is operating under a large load.

The present invention achieves the above-described objects by providing a device that transfers torque from an internal-combustion engine of a vehicle-drive system to a transmission through a main clutch. A dynamo-electric-machine mechanism is connected to an input shaft of the transmission through an assistant clutch. Accessories are connected to the dynamo-electric-machine mechanism. Different modes of operation are then achieved by connecting and disconnecting the main and assistant clutch.

In another aspect of the present invention, a torque converter with a lock mechanism is used. The torque converter is disposed between the input shaft of the transmission, the main clutch and the assistant clutch. In this aspect, both the clutches can be attached to an input shaft of the torque converter. However, where this torque converter is used, it is preferable that the torque converter with a lock mechanism is employed for brake operation and is locked during braking of the vehicle.

In a further aspect of the present invention, the accessories are connected to the input shaft of the transmission through the assistant clutch.

In another aspect of the present invention, the dynamo-electric-machine mechanism drives the accessories with the assistant clutch disconnected when the internal-combustion engine and the vehicle are not operating. Here, when the internal-combustion engine is started, the dynamo-electric-machine mechanism drives the internal-combustion engine through both clutches while both are connected. The vehicle recovers inertial power when it is braked through the assistant clutch, while the main clutch is disconnected. When the internal-combustion engine is started, the vehicle is driven by the internal-combustion engine through both the clutches. Therefore, inertial power from the vehicle is recovered by the dynamo-electric-machine mechanism instead of being lost as friction in the internal-combustion engine. When the internal-combustion engine is started, the transmission is shifted to neutral or park. Accordingly, the output shaft of the transmission is not driven by the dynamo-electric-machine mechanism.

When the internal-combustion engine is operated, the dynamo-electric-machine mechanism is driven by the internal-combustion engine through both the clutches. However, when operating, the internal-combustion engine supplies power through the transmission. When idling, the internal-combustion engine supplies torque to the dynamo-electric-machine mechanism and the accessories while preventing torque from being transferred through the transmission. This is accomplished by shifting the transmission to the neutral position or the parking position or by depressing a brake pedal with the torque converter being added to the transmission.

In another aspect of the invention, the accessories are connected to the dynamo-electric-machine mechanism not through the clutch. The accessories recover inertial power from the vehicle through the assistant clutch with the main clutch disconnected. The accessories are driven together with the dynamo-electric-machine mechanism by the internal-combustion engine through both the clutches when the internal-combustion engine is operated.

In another aspect of the invention, the dynamo-electric-machine mechanism operates electrically and assists the internal-combustion engine in supplying torque for running. This assisted torque is supplied through the assist clutch, connected when the engine undergoes a large running load, while operating. Therefore, larger torque can be obtained.

In another aspect of the invention, both clutches are connected to make the dynamo-electric-machine mechanism generate electricity during major brake operations of the vehicle wherein the vehicle is decelerated quickly. The vehicle can be braked due to both friction loss of the internal-combustion engine and recovery-electric power of the dynamo-electric-machine mechanism.

The accessories can be connected directly to the dynamo-electric-machine mechanism through the torque-transfer mechanism, or to the input shaft of the transmission through the torque-transfer mechanism. Further, the accessories can be connected to the torque-transfer mechanism as described above through an added clutch.

In another aspect of the invention, an undulating lever for the main clutch and an undulating lever for the assistant clutch are disposed around the input shaft of the transmission, with their undulating spaces being overlapped in axial directions thereof. The undulating lever for the main clutch is a portion of an impelling mechanism for connecting or disconnecting the main clutch. The undulating lever for the assistant clutch is a portion of an impelling mechanism for connecting or disconnecting the assistant clutch. Therefore, the input shaft of the transmission (including a shaft of a disk connected to the input shaft of the transmission) can be shortened, thereby making the structure of the system more compact. Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

In a vehicle-drive system according to the present invention, a dynamo-electric-machine mechanism is operationally engaged with an input shaft of a transmission. The dynamo-electric-machine mechanism includes a single generator motor, or multiple other devices such as a starter motor and an alternator.

Figure 1:
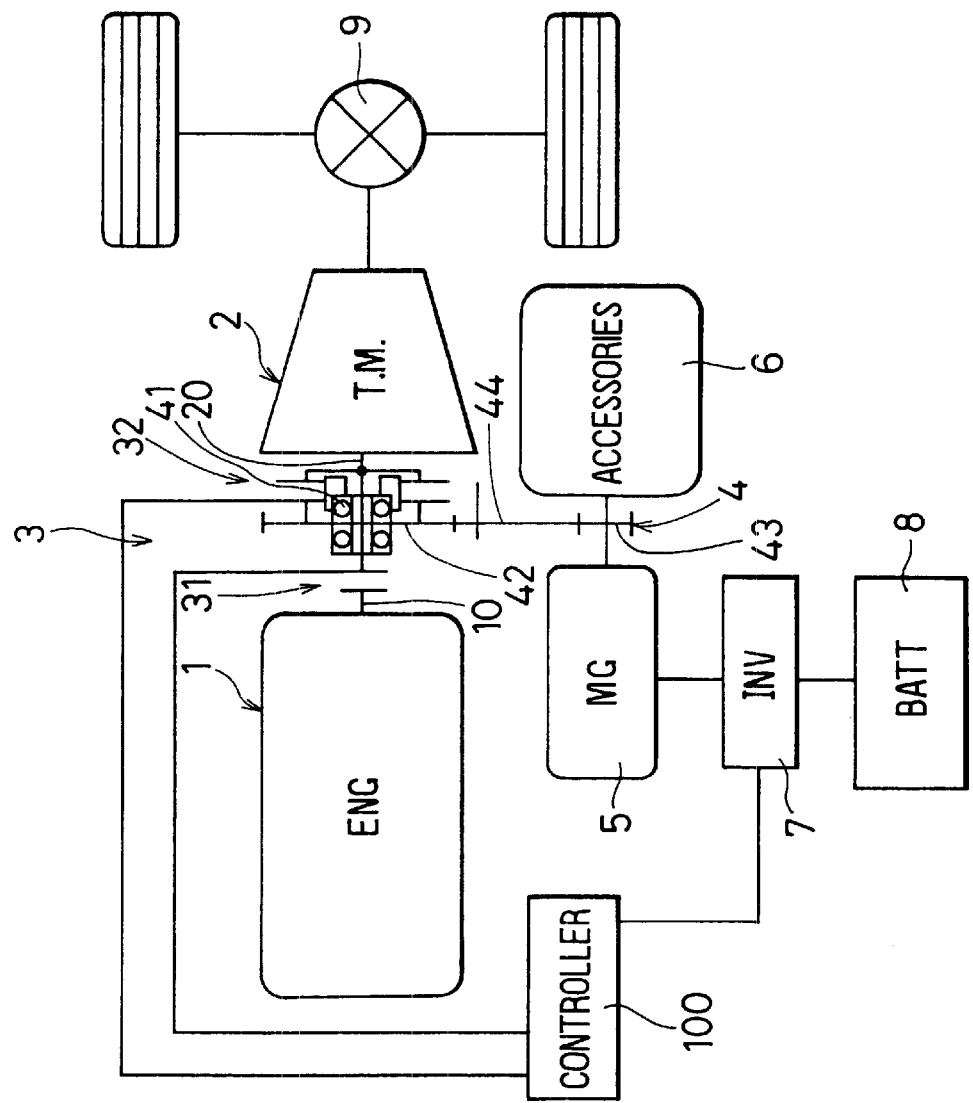
FIG. 1 is a block diagram of a vehicle-drive system according to a first embodiment of the present invention.

In FIG. 1, a first embodiment of the present invention provides a vehicle-drive system which includes internal combustion engine 1, transmission 2, clutch mechanism 3, belt mechanism 4 (torque-transfer mechanism), generator motor 5 (dynamo-electric-machine mechanism), accessories 6, three-phase inverter 7, battery 8, and differential gear 9.

Clutch mechanism 3 includes main clutch 31 and assistant clutch 32. Main clutch 31 is provided between input shaft 20 of transmission 2 and crankshaft 10 of internal combustion engine 1. Assistant clutch 32 is provided between input shaft 20 and a pulley supporting belt mechanism 4. Generator motor 5 and accessories 6, such as an air-conditioning compressor (not shown), serially communicate with input shaft 20 of transmission 2 through belt mechanism 4 and assistant clutch 32.

Belt mechanism 4 includes pulley 42 supported by input shaft 20 allowing it to move in a rotational direction thereof through bearing 41, pulley 43 to which generator motor 5 and accessories 6 are connected, and belt 44 for coupling both pulleys 42, 43.

The generator motor 5, which is a three-phase brushless DC motor, gives electric power to battery 8 and receives it therefrom through three-phase inverter 7 and the battery. Here, three-phase inverter 7 includes three pairs of upper-arm-side devices and three pairs of lower-arm-side devices, which are not shown in the drawing. Each of the devices is composed of a switching element such as an IGBT and a flywheel diode, which are connected in inverse parallel.

Controller 100 controls main clutch 31, assistant clutch 32 and three-phase inverter 7. Three-phase inverter 7, in turn, controls generator motor 5. Since the control of three-phase inverter 7 for generator motor 5 is well known, it is not explained.

In a first control operation, internal-combustion engine 1 is started by a dynamo-electric-machine mechanism. Here, when internal-combustion engine 1 receives a start-command signal, controller 100 detects and determines whether transmission 2 is in neutral or park. If either are true, main clutch 31 and assistant clutch 32 are connected. Generator motor 5 is then operated electrically and internal-combustion engine 1 is started.

In a second control operation, the dynamo-electric-machine mechanism generates electricity and drives accessories with the internal-combustion engine. After the internal-combustion engine is started, controller 100 drives accessories 6 with internal-combustion engine 1 through main clutch 31 and assistant clutch 32, while switching the operation of generator motor 5 from electrical-drive operation to power-generation operation. Thereafter, when a vehicle runs according to the operation of transmission 2, the same operation as described above is performed.

In a third control operation, inertial power from a vehicle is recovered without friction loss by the internal-combustion engine by the dynamo-electric-machine mechanism and accessories. When controller 100 detects brake operation or receives a signal corresponding to an accelerator pedal being released, it disconnects main clutch 31, connects assistant clutch 32, and actuates generator motor 5 to generate electricity. Thus, generator motor 5 and accessories 6 are driven by inertial power from a vehicle, and battery 8 is charged by the generated electric power.

In a fourth control operation, internal-combustion engine 1 is assisted in supplying torque for vehicle operation either when the vehicle starts running or while running. When the vehicle starts running, controller 100 assists internal-combustion engine 1 in supplying torque to the vehicle by electrically driving generator motor 5 to aid internal-combustion engine 1. Alternatively, controller 100 stops generator motor 5 from generating power, thereby reducing the load on internal-combustion engine 1. Similarly, if the accelerator pedal is largely depressed while the vehicle is running, controller 100 reduces the load on internal-combustion engine 1 by electrically driving generator motor 5 or stopping power generation thereof.

In a fifth control operation, a damping operation is provided for the vehicle engine. Here, controller 100 controls power-generation quantity or electrical-drive quantity of generator motor 5 in a phase opposite to torque fluctuation of internal-combustion engine 1. As a result, fluctuation of torque output from internal-combustion engine 1 is reduced, thereby reducing vibration and noise.

In a sixth control operation, a major brake operation is provided for the vehicle. When the brake pedal is largely depressed, controller 100 electrically drives generator motor 5 by connecting both main clutch 31 and assistant clutch 32, thereby recovering inertial power from the vehicle as generated electric-power. This recovered power is used as braking power for assistance of the brake force. As a result of this power usage, wear of the vehicle's brake friction pad is reduced. This recovered power is used as driving power for accessories and friction losses of the engine.

In a seventh control operation, the vehicle is moved with generator motor 5. When internal-combustion engine 1 is stopped, main clutch 31 is disconnected and assistant clutch 32 is connected. The vehicle is then moved by electrical operation of generator motor 5.

Figure 2:
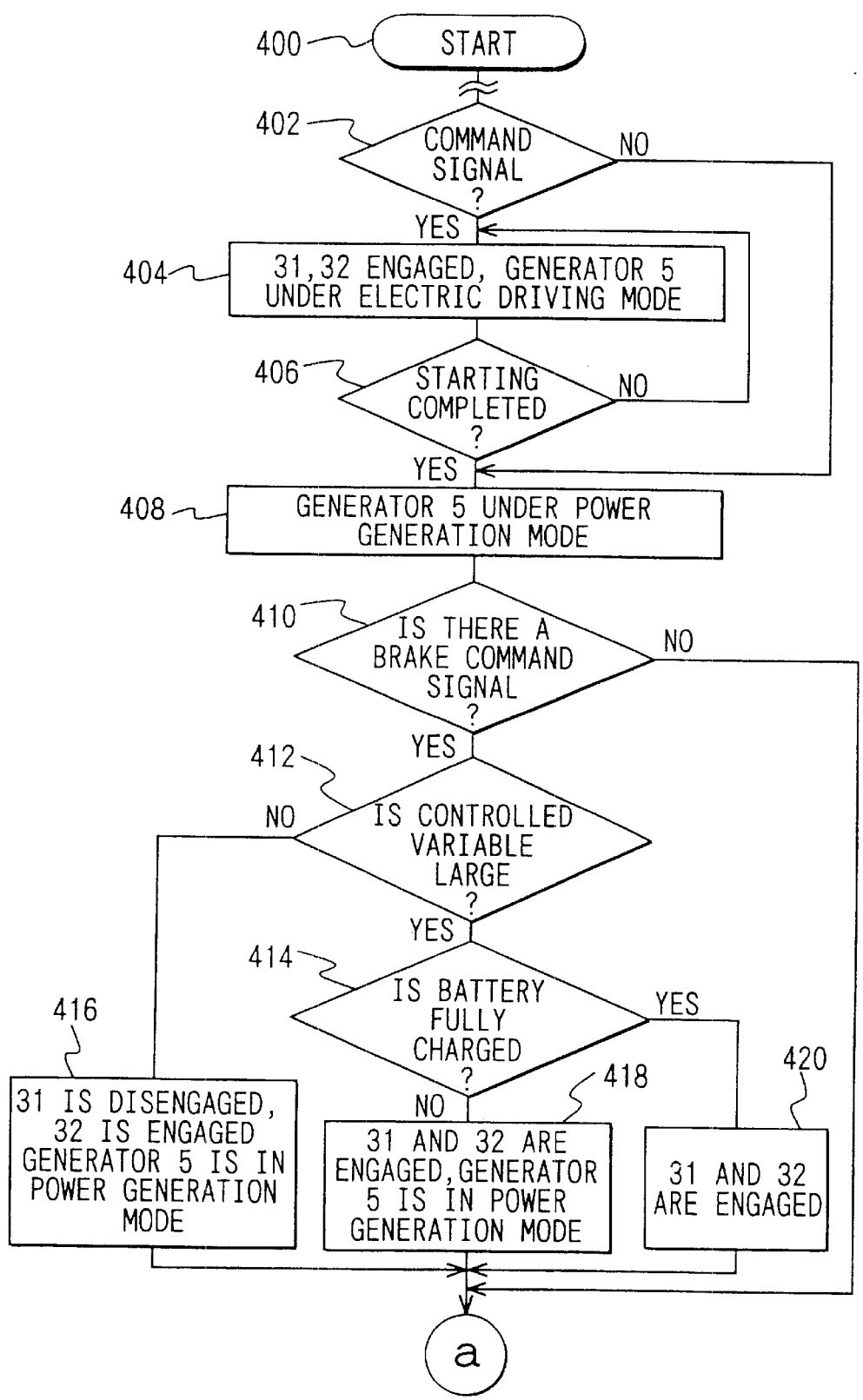
FIG. 2 is a flowchart showing operation of the vehicle-drive system shown according to the present invention.

The above-mentioned control operation of controller 100 is shown in a flowchart in FIG. 2. Here, as shown in FIG. 2, the process begins at block 400 start. Next, the flow chart moves to block 402 where it is determined whether a command signal is received by the controller 100. If this is true, the generator 5 is operated under electric drive mode. Then, the program moves to block 406 and determines whether starting is completed. If not, the program continues in electric drive mode until starting is completed. Once starting is complete, or if a no decision is observed in 402, block 408 is executed next. Here, generator 5 is operated under power generation mode. Next, it is determined whether there is a brake command signal in block 410. If none, the program ends. If there is a brake command, the program moves to block 412 where the value of the brake signal is determined, as indicated by the controlled variable. If the controlled variable is not large, then the program moves to block 416. Here, clutch 31 is disconnected and clutch 32 is connected since there is not a large amount of braking force that must be supplied. Generator 5 is also operated under a power generation mode. If the controlled variable is determined to be large, then the program moves to block 414. Here, it is determined whether the battery is fully charged. If so, block 420, clutch 31 and clutch 32 are engaged in block 420 to absorb braking force. If not, in Block 418, clutches 31 and 32 are engaged, and generator 5 is operated under a power generation mode to charge the batteries.

Figure 3:
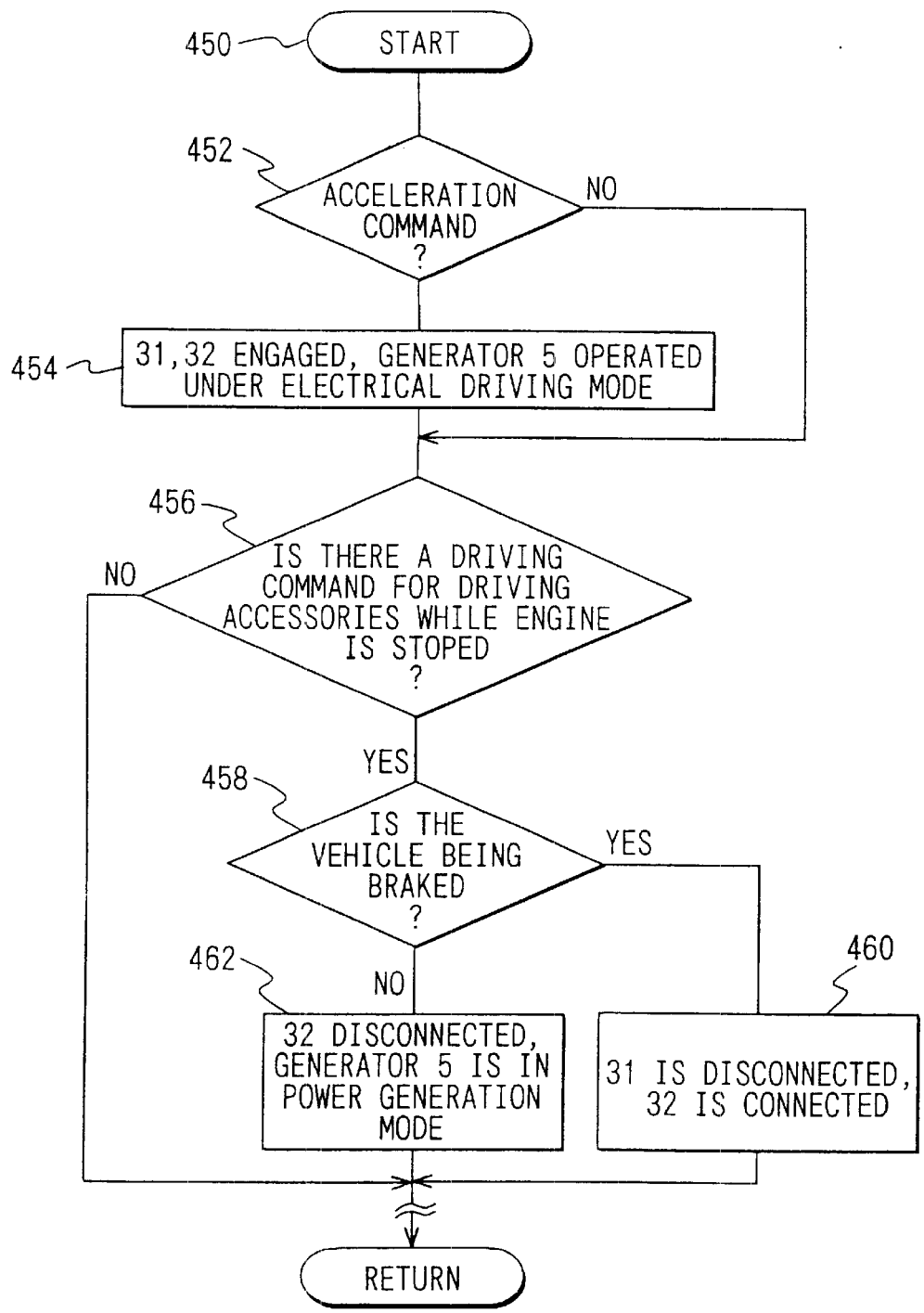
FIG. 3 is a flowchart showing operation of the vehicle-drive system according to the present invention.

Referring now to FIG. 3, a second process is shown beginning in block 450. In block 452, an acceleration command is sensed. If the vehicle is accelerated, both clutches 31 and 32 are engaged and the generator 5 is operated under electrical driving mode in block 454 to assist the engine. If no acceleration, then block 454 is skipped. In block 456, a driving signal for driving the accessories is sensed. If this signal is sensed, block 458 determines whether the vehicle is being braked. If the vehicle is being braked, then block 460 disconnects clutch 31, connects clutch 32. If the vehicle is not being braked, then block 462 disconnects clutch 32 and maintains generator 5 in a power generation mode.

Figure 4:
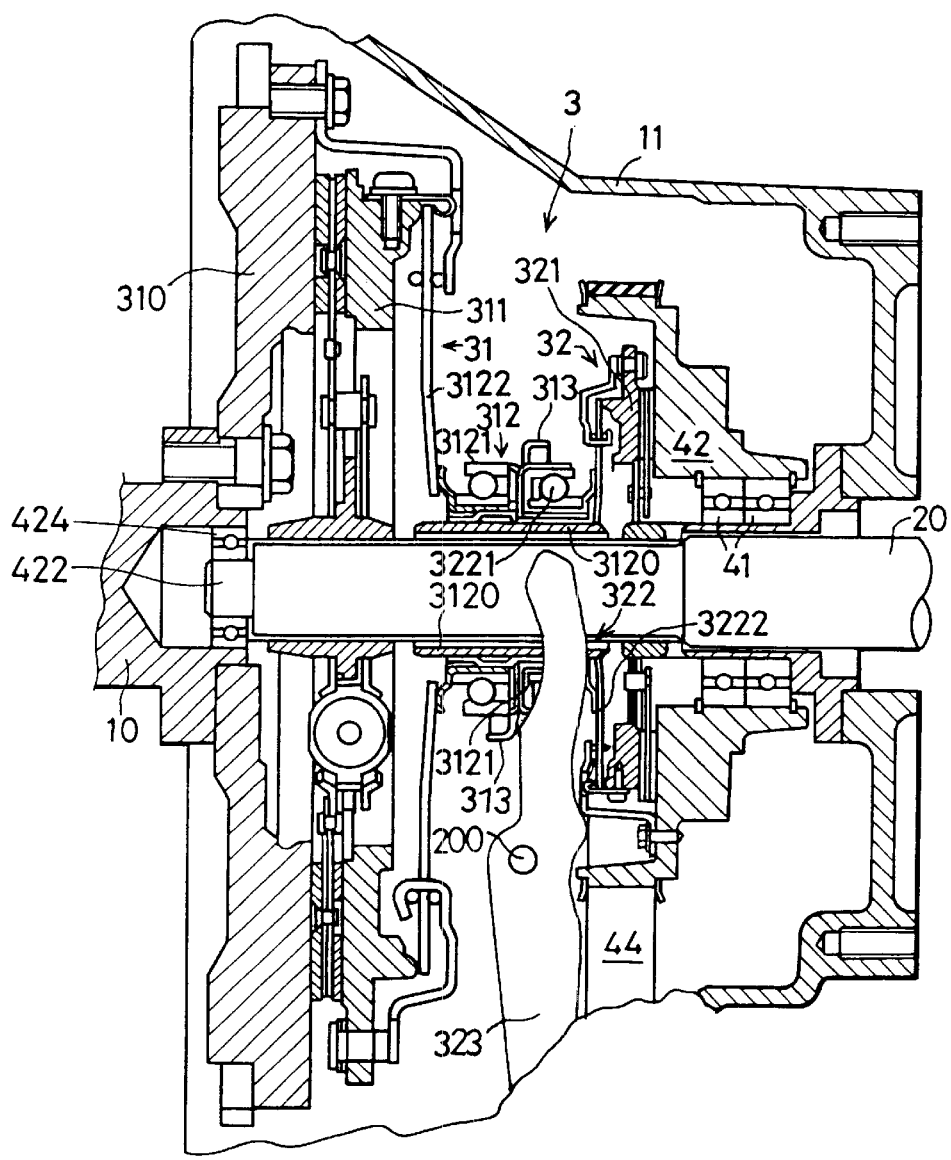
FIG. 4 is a cross-sectional view of a clutch mechanism for a vehicle-drive system according to the present invention.

Referring now to FIG. 4, clutch mechanism 3 is explained in greater detail. Clutch casing 11 is clamped between and fastened to internal-combustion engine 1 and transmission 2. A tip 422 of input shaft 20 of transmission 2 is mounted onto crank shaft 10, rotatably supported by bearing 424.

Main clutch 31 includes internal-combustion-engine-side disk 310 fixed to crank shaft 10, input-shaft-side disk 311, impelling tube 312 and undulating lever 313. Input-shaft-side disk 311 is splined to input shaft 20 to allow relative movement therebetween in an axial direction. However, the splines prohibit rotational movement. Impelling tube 312 is fit around input shaft 20 of transmission 2 and is axially and rotationally moveable along input shaft 20. Impelling tube 312 impels input-shaft-side disk 311 in the axial direction thereof. Undulating lever 313 impels impelling tube 312 in an axial direction thereof by undulating so as to move like a see-saw.

Impelling tube 312 includes base tube 3120 and bearing 3121 attached to base tube 3120. Base tube 3120 axially and rotationally slide along input shaft 20.

Undulating lever 313, whose tip only is shown in FIG. 4, is supported by clutch casing 11 so as to undulate and move like a see-saw in its horizontal plane. Its base end is impelled by an oil hydraulic cylinder, and its tip impels an outer ring of bearing 3121 in the axial direction of input shaft 20.

Undulating lever 313 is made to undulate so as to move like a see-saw, caused by an oil hydraulic cylinder, so that the outer ring of bearing 3121 thereof is impelled to the right-side direction in FIG. 4. This axial thrust slides impelling tube 312 to the right-side direction in FIG. 4 through an inner ring of bearing 3121. Impelling tube 312 impels input-shaft-side disk 311 to the right-side direction through thrust spring 3122 or the like. Thus, input-shaft-side disk 311 is released from internal-combustion-engine-side disk 310, so that main clutch 31 is disconnected.

If undulating lever 313 is moved in the opposite direction to the above-described case, its tip impels the outer ring of bearing 3121 to the left-side direction in FIG. 4. Then, this axial thrust slides impelling tube 312 to the left-side direction in FIG. 4 through the inner ring of bearing 3121, and impelling tube 312 impels input-shaft-side disk 311 to the left-side direction through thrust spring 3122 or the like. Thus, input-shaft-side disk 311 is thrust into internal-combustion-engine-side disk 310, so that main clutch 31 is connected.

Assistant clutch 32 includes a pulley 42 (an accessory-side disk) attached to input shaft 20, rotationally supported by bearing 41. Assistant clutch 32 also includes an input-shaft-side disk 321, impelling tube 322 and undulating lever 323. Input-shaft-side disk 321 is splined to input shaft 20 to allow axial movement but not rotational movement therebetween. Impelling tube 312 impels input-shaft-side disk 321. Impelling tube 312 is splined to base tube 3120 of impelling tube 312 to provide axial but not radial movement therebetween. Undulating lever 323 impels impelling tube 322 in an axial direction thereof by undulating about point 200 to move like a see-saw.

Impelling tube 322 includes base tube 3220 and bearing 3221 attached to base tube 3220. Base tube 3220 is attached to base tube 3120 of impelling tube 312 of main clutch 31 so as to move relative thereto in an axial direction thereof but so as not to move relative thereto in a rotational direction thereof.

Undulating lever 323 is supported by clutch casing 11 so as to undulate and move like a see-saw in its vertical plane, and its base end is impelled by an oil hydraulic cylinder not shown in the drawing. Undulating lever 323 has a tip which impels an outer ring of bearing 3221 in the axial direction of input shaft 20.

When undulating lever 323 is moved by the oil hydraulic cylinder, the outer ring of bearing 3221 thereof is impelled to the right-side direction in FIG. 4. This axial thrust slides impelling tube 322 to right-side direction in FIG. 4 through an inner ring of bearing 3221. As a result, impelling tube 322 moves input-shaft-side disk 321 to the right-side direction through thrust spring 3222. Thus, input-shaft-side disk 321 is thrusted into pulley 42, thereby connecting clutch 32.

If undulating lever 323 is moved in the opposite direction, its tip impels the outer ring of bearing 3221 to the left-side direction in FIG. 4. Then, this axial thrust slides impelling tube 322 to the left-side direction in FIG. 4 through the inner ring of bearing 3221. Impelling tube 322 impels input-shaft-side disk 321 to the left-side direction through thrust spring 3222 or the like. Thus, input-shaft-side disk 321 is released from pulley 42, so that assistant clutch 31 is disconnected.

Figure 5:
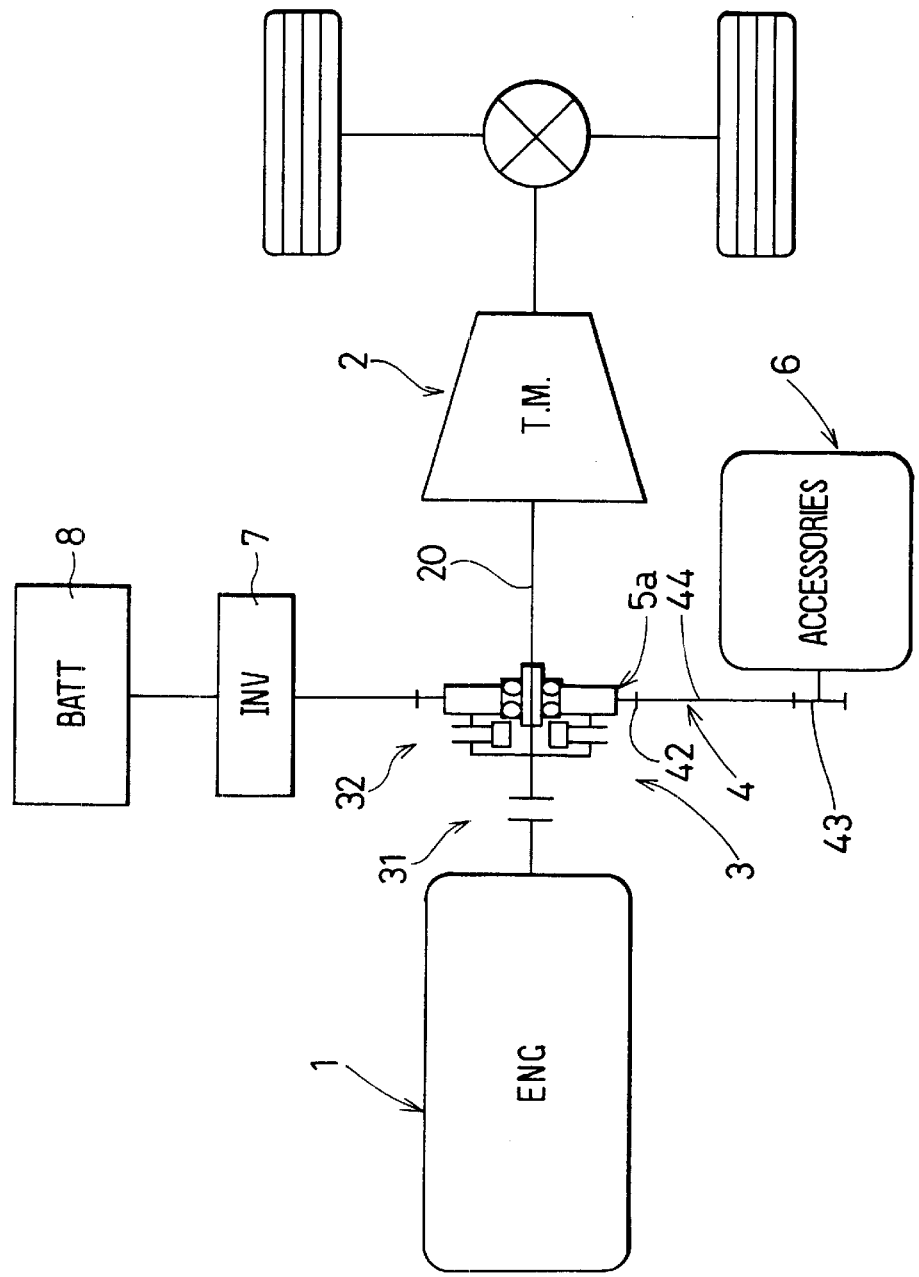
FIG. 5 is block diagram of the vehicle-drive system according to a second embodiment of the present invention.

Referring now to FIG. 5, a vehicle-drive system according to a second embodiment of the present invention has a generator motor 5*a* attached to input shaft 20 of transmission 2 so as to move in the rotational direction thereof in the vehicle-drive system shown in FIG. 1.

Generator motor 5a, for example, is composed of a three-phase brushless DC motor, and includes a rotor and a stator surrounding the rotor. The rotor is supported by input shaft 20 of transmission 2, supported by a pair of bearings, rotatably movable. Pulley 42, also shown in the first embodiment, is fixed to the rotor. Assistant clutch 32 is provided between pulley 42 and input shaft 20 of transmission 2, and has substantially the same structure as shown in the first embodiment. Pulley 43 of accessories 6 is driven by pulley 42 through belt 44.

Figure 6:
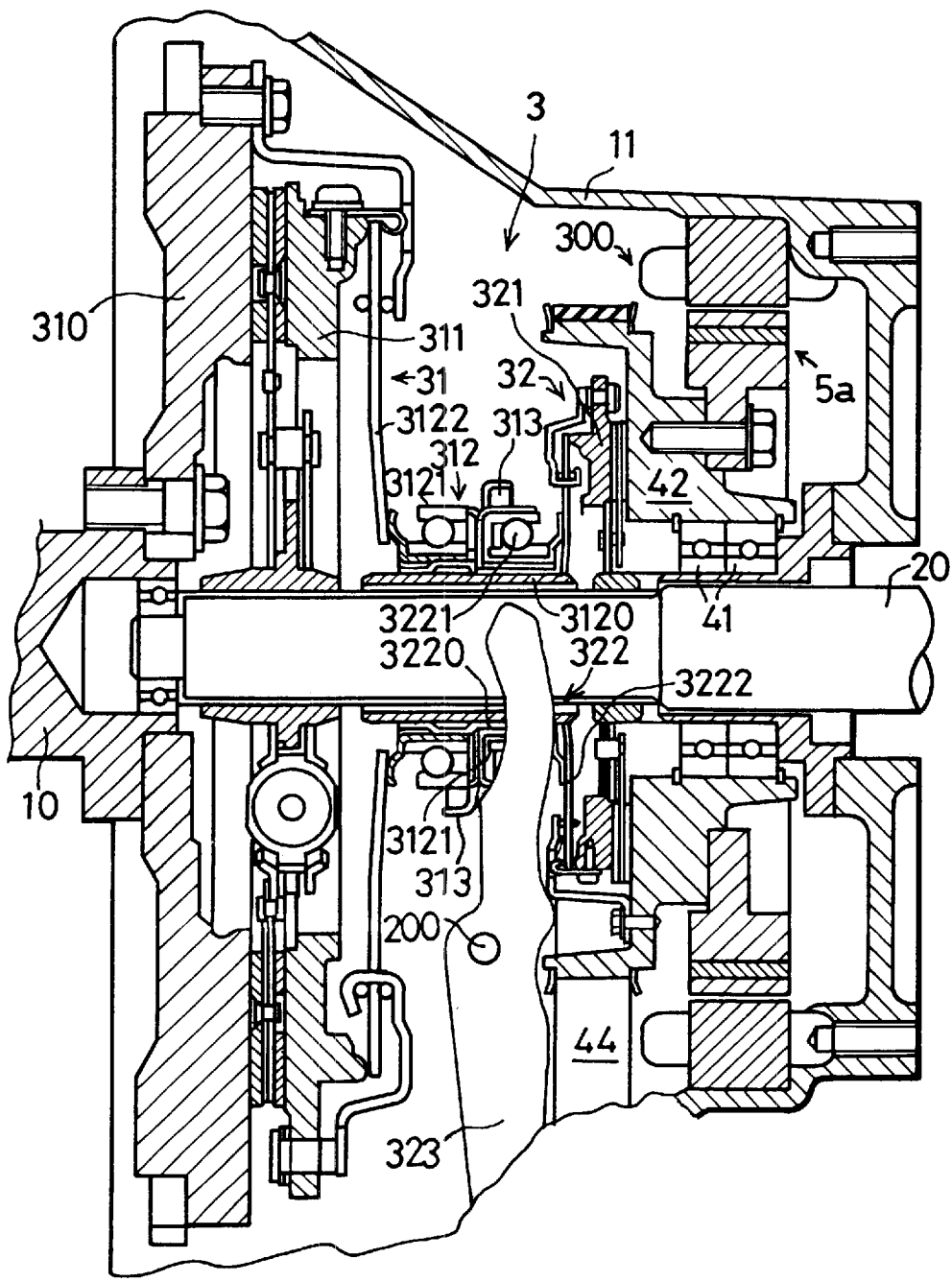
FIG. 6 is a cross-sectional view of a clutch mechanism of a vehicle-drive system according to the present invention.

Clutch mechanism 3, as shown in FIG. 6, is similar to the first embodiment (shown in FIG. 4), with the addition of generator motor 5a. The rotor of generator motor 5a is fixed to pulley (accessory-side disk) 42 by bolts, and the stator thereof is fixed to clutch casing 11.

In the above-described embodiment, assistant clutch 32 is attached to input shaft 20 of transmission 2. However, assistant clutch 32 can be contained in pulley 43 inside generator motor 5. Preferably, accessories 6 are connected to generator motor 5 not through assistant clutch 32. However, theses elements may be connected through assistant clutch 32.

While the above-described embodiments refer to examples of usage of the present invention, it is understood that the present invention may be applied to other usage, modifications and variations of the same, and is not limited to the disclosure provided herein.

What is claimed is:

1. A vehicle-drive system which transfers torque from an internal-combustion engine to a transmission through a main clutch, said vehicle-drive system comprising:
   a dynamo-electric-machine mechanism operationally engaged to an input shaft of the transmission through an assistant clutch; and
   accessories operationally engaged to the dynamo-electric-machine mechanism, wherein
      the assistant clutch is operable to allow torque transfer directly between the engine and the transmission,
      the dynamo-electric-machine mechanism is capable of driving the accessories with the assistant clutch disconnected when the internal-combustion engine and the vehicle stop operating, the dynamo-electric-machine mechanism is capable of driving the internal-combustion engine through the main clutch and the assistant clutch when the internal-combustion engine is started, wherein with the main clutch disconnected and the assistant clutch connected, the dynamo-electric machine mechanism is capable of recovering inertial power from the vehicle when the vehicle is braked, and with the main clutch and the assistant clutch both connected, the accessories are driven by the internal-combustion engine when the internal-combustion engine is operated, and
      the accessories are connected to the dynamo-electric-machine mechanism, the accessories recovering inertial power of the vehicle through the assistant clutch with the main clutch disconnected and the accessories being driven by the internal-combustion engine through both the clutches when the internal-combustion engine is operated.

2. The vehicle-drive system as in claim 1, wherein the main clutch and the assistant clutch are engaged during a large running load, the dynamo-electric-machine mechanism operates electrically and supplies running torque together with the internal-combustion engine during the large running load.

3. The vehicle-drive system as in claim 1, wherein the main clutch and the assistant clutch are engaged during braking operations, wherein the internal-combustion engine and the dynamo-electric-machine mechanism absorb rotation load and the dynamo-electric-machine mechanism generates electricity.

4. The vehicle-drive system as in claim 1, wherein the dynamo-electric-machine mechanism is composed of a single generator motor.

5. The vehicle-drive system as in claim 1, wherein the assistant clutch transmits or receives torque through the input shaft of the transmission, the input shaft being disposed un-coaxially to the assistant clutch.

6. The vehicle-drive system as in claim 1, wherein the main clutch is engaged with the input shaft of the transmission and the assistant clutch is positioned between the main clutch and the transmission, the assistant clutch being operationally engaged with an input shaft of the transmission.

7. The vehicle-drive system as in claim 1, wherein the main clutch is operable to allow torque transfer directly between the dynamo-electric-machine mechanism and the transmission.

8. The vehicle-drive system as in claim 7, wherein the main clutch and the assistant clutch are operable to allow torque transfer between the engine and transmission and the dynamo-electric-machine mechanism and the transmission simultaneously.

9. A vehicle-drive system which transfers torque from an internal-combustion engine to a transmission through a main clutch, said vehicle-drive system comprising:
   a dynamo-electric-machine mechanism operationally engaged to an input shaft of the transmission through an assistant clutch; and
   accessories operationally engaged to the dynamo-electric-machine mechanism, wherein
      the assistant clutch is operable to allow torque transfer directly between the engret and the transmission;
      the dynamo-electric-machine mechanism is composed of a single generator motor;
      the main clutch is engaged with the input shaft of the transmission and the assistant clutch is positioned between the main clutch and the transmission, the assistant clutch being operationally engaged with an input shaft of the transmission;
      the main clutch comprises an internal-combustion-engine-side disk affixed to a crank shaft, an input-shaft-side disk, a main impelling tube and a main undulating lever, the input-shaft-side disk being engaged to an input shaft of the transmission to move relative thereto in an axial direction thereof, the main impelling tube engaged to the input shaft to move axially and rotationally relative to the input shaft, said main impelling tube impels the main input-shaft-side disk axially with respect to the input shaft, the main undulating lever impels the impelling tube in an axial direction thereof by undulating so as to move like a see-saw; and
      the assistant clutch comprises an accessory-side disk, an assistant input-shaft-side disk, an assistant impelling tube and an assistant undulating lever, the accessory-side disk is engaged to the input shaft to transfer torque from the input shaft to the generator motor and the accessories, the accessory input-shaft-side disk movable in an axial direction with respect to the input shaft, the impelling tube is attached to the base tube of the impelling tube of the main clutch to move relative thereto in an axial direction thereof, said impelling tube impels the accessory input-shaft-side disk, the accessory undulating lever impels the impelling tube in an axial direction thereof by undulating so as to move like a see-saw.

10. A vehicle-drive system which transfers torque from an internal-combustion engine to a transmission for a vehicle, said vehicle-drive system comprising:

a main clutch connecting an output of said internal combustion engine to an input to said transmission, torque being transmitted between said internal combustion engine and said input to said transmission when said main clutch is engaged, no torque being transmitted between said internal combustion engine and said input to said transmission when said main clutch is disengaged;

an assistant clutch connecting a number of accessories and said input to said transmission;

a dynamo-electric-machine mechanism connected to said input to said transmission through said assistant clutch, torque being transmitted between said dynamo-electric-machine mechanism and said input to said transmission when said assistant clutch is engaged, no torque being transmitted between said dynamo-electric-machine mechanism and said input to said transmission when said assistant clutch is disengaged, said dynamo-electric machine electrically communicating with a storage battery to transfer electrical energy between said dynamo-electric machine and said storage battery; and a controller electrically communicating with said main clutch and said assistant clutch to engage and disengage said main clutch and said assistant clutch, said controller electrically communicating with a control circuit for switching said dynamo-electric-machine mechanism between a power generation mode and an electrical driving mode;

wherein the assistant clutch is operable to allow torque transfer directly between the engine and the transmission.

11. The vehicle drive system as claimed in claim 10, wherein said controller engages said main clutch and said assistant clutch when said internal combustion engine is being started, said controller switching said dynamo-electric machine to an electrical-driving mode when said internal combustion engine is being started.

12. The vehicle-drive system as in claim 10, wherein the controller disengages the assistant clutch and switches said dynamo-electric machine to a electrical driving mode when the internal-combustion engine stops operating, whereby dynamo-electric machine drives said accessories.

13. The vehicle-drive system as in claim 10, wherein said controller engages said main clutch and said assistant clutch during braking operations, wherein said internal-combustion engine and said dynamo-electric-machine mechanism absorb rotation load and said dynamo-electric machine generates electricity.

14. A vehicle-drive system, comprising:

an engine coupled to a main clutch, the main clutch being coupled to a transmission to allow selective torque transfer between the engine and transmission; and a motor/generator coupled to an assistant clutch, the assistant clutch being coupled to the transmission to allow selective torque transfer between the motor/generator and transmission, wherein torque transfer between the engine and transmission is discontinuable via the main clutch to allow torque to be transferred directly and only between the motor-generator and transmission, torque transfer between the motor/generator and transmission is discontinuable via the assistant clutch to allow torque to be transferred directly and only between the engine and transmission, torque transfer between the engine and transmission and between the motor/generator and transmission may be simultaneously performed via the main clutch and assistant clutch, respectively and an accessory is coupled to the motor/generator such that 1) the accessory is drivable by only the motor/generator when the assistant clutch is disengaged, 2) the accessory is drivable by at least one of the motor/generator and inertial energy from the transmission when the assistant clutch is engaged and the main clutch is disengaged, and 3) the accessory is drivable by at least one of the engine, motor/generator, and inertial energy from the transmission when the main and assistant clutches are both engaged.

\* \* \* \* \*